(12) United States Patent
Miyamura et al.

(10) Patent No.: US 11,308,989 B1
(45) Date of Patent: Apr. 19, 2022

(54) OPTIMIZING TAPE DRIVES IN A TAPE LIBRARY

(71) Applicant: International Business Machines Corporation, Armonk, NY (US)

(72) Inventors: Tsuyoshi Miyamura, Yokohama (JP); Noriko Yamamoto, Tokyo (JP); Hiroshi Itagaki, Yokohama (JP); Tohru Hasegawa, Tokyo (JP); Shinsuke Mitsuma, Machida (JP); Atsushi Abe, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/215,404

(22) Filed: Mar. 29, 2021

(51) Int. Cl.
  *G11B 15/093* (2006.01)
  *G11B 15/32* (2006.01)
  *G11B 15/43* (2006.01)
  *G11B 5/008* (2006.01)

(52) U.S. Cl.
  CPC .......... *G11B 15/32* (2013.01); *G11B 5/00813* (2013.01); *G11B 15/093* (2013.01); *G11B 15/43* (2013.01); *G11B 5/00817* (2013.01); *G11B 5/00891* (2013.01)

(58) Field of Classification Search
  None
  See application file for complete search history.

(56) References Cited

U.S. PATENT DOCUMENTS

| | | | | |
|---|---|---|---|---|
| 4,531,166 A | * | 7/1985 | Anderson | G11B 5/09 318/7 |
| 6,871,810 B2 | * | 3/2005 | Barndt | G11B 15/66 242/334.1 |
| 6,918,553 B2 | * | 7/2005 | Zwettler | G11B 15/43 360/71 |
| 10,056,099 B1 | * | 8/2018 | Nylander-Hill | G11B 5/584 |
| 10,395,677 B2 | * | 8/2019 | Breuer | G11B 5/1871 |
| 10,497,391 B1 | * | 12/2019 | Miyamura | G11B 5/00817 |
| 10,832,723 B1 | * | 11/2020 | Nave | G11B 15/093 |
| 2014/0379983 A1 | | 12/2014 | Sasaki | |
| 2019/0189155 A1 | | 6/2019 | Noriko | |
| 2020/0143830 A1 | | 5/2020 | Judd | |

FOREIGN PATENT DOCUMENTS

| | | |
|---|---|---|
| JP | 11007619 A | 1/1999 |
| JP | 2000148406 A | 5/2000 |
| JP | 2001297506 A | 10/2001 |
| JP | 2007115397 A | 5/2007 |

* cited by examiner

*Primary Examiner* — Tan X Dinh
(74) *Attorney, Agent, or Firm* — Joseph P. Curcuru

(57) ABSTRACT

An approach for improving the tape storage media by optimizing tape drives in a tape library. Embodiments manage, by a web interface provided by a tape library, an inventory of one or more tape drives and the one or more tape media in the tape library, and record high tension discharge and distance measurement after formatting in a cartridge memory of the one or more tape media in the tape library. Further, embodiments manage the high tension discharge and the distance measurement after formatting in the cartridge memory of the one or more tape media by measuring a distance between servo bands utilizing one or more unused tape drives and one or more low frequency tape drives in the tape library, and execute a rewind at low tension using the one or more unused tape drive and the one or more low frequency tape drives.

20 Claims, 9 Drawing Sheets

OPTIMIZING TAPE DRIVES IN A TAPE LIBRARY

BACKGROUND OF THE INVENTION

The present application relates generally to magnetic tape file systems and more specifically to optimizing tape drives in a tape library.

In computer storage, a tape library, sometimes called a tape silo, tape robot or tape jukebox, is a storage device that contains one or more tape drives, a number of slots to hold tape cartridges, a barcode reader to identify tape cartridges and an automated method for loading tapes. Tape libraries may contain millions of tapes. A tape drive is a data storage device that reads and writes data on a magnetic tape. Magnetic tape data storage is typically used for offline, archival data storage. Tape media generally has a favorable unit cost and a long archival stability. A tape drive provides sequential access storage, unlike a hard disk drive, which provides direct access storage. A disk drive can move to any position on the disk in a few milliseconds, but a tape drive must physically wind tape between reels to read any one particular piece of data. As a result, tape drives have very large average access times. However, tape drives can stream data very quickly off a tape when the required position has been reached.

SUMMARY

As disclosed herein, embodiments of the present invention disclose a method, a computer program product, and a system for rewinding a tape at low tension, the computer-implemented method comprising: managing, by a web interface provided by a tape library, an inventory of one or more tape drives and the one or more tape media in the tape library; recording high tension discharge and distance measurement after formatting in a cartridge memory of the one or more tape media in the tape library; managing the high tension discharge and the distance measurement after formatting in the cartridge memory of the one or more tape media by measuring a distance between servo bands utilizing one or more unused tape drives and one or more low frequency tape drives in the tape library; and executing a rewind at low tension using the one or more unused tape drive and the one or more low frequency tape drives.

DETAILED DESCRIPTION

Figure 1:
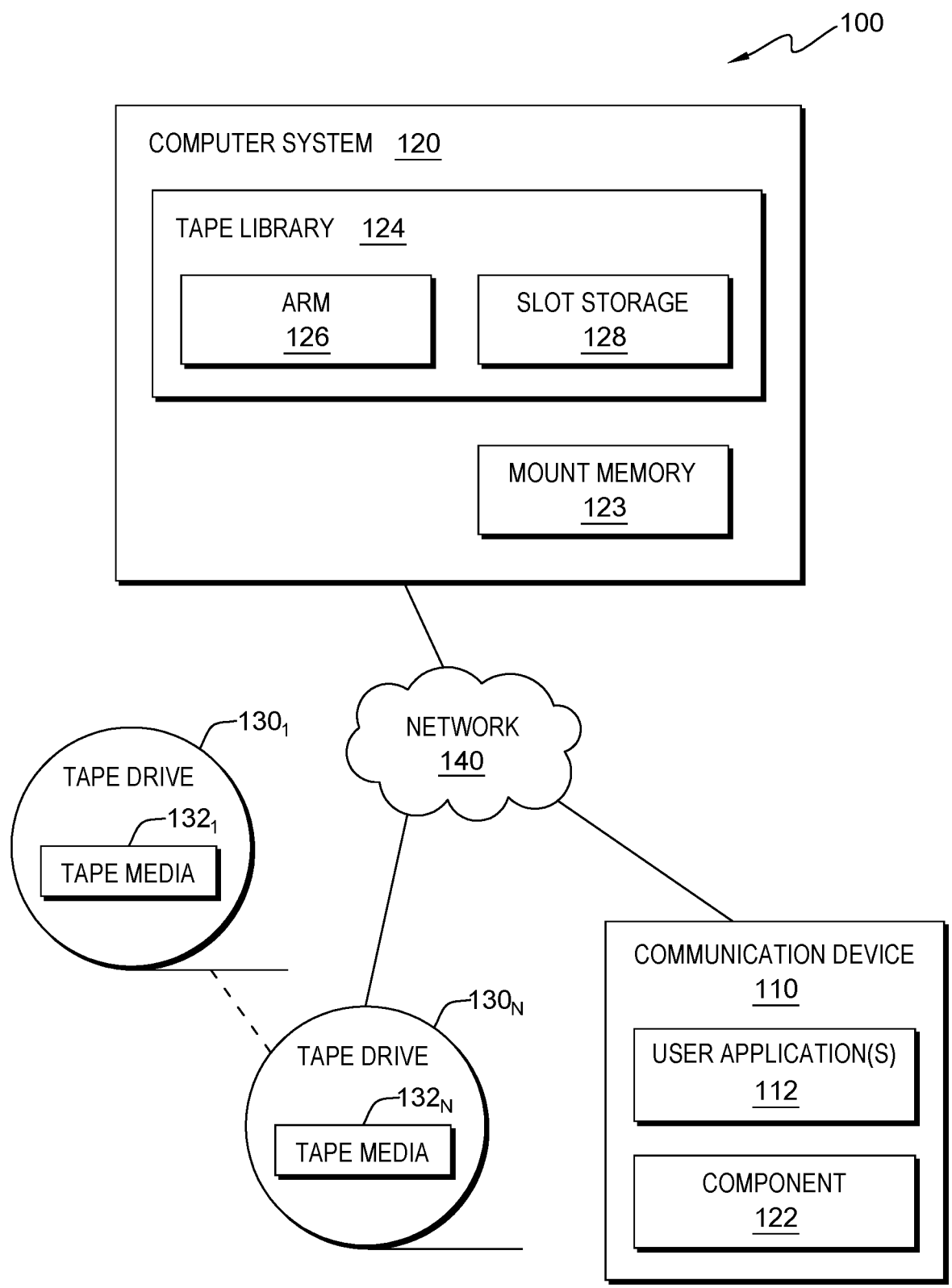
FIG. 1 illustrates a functional block diagram of a computing environment, in accordance with an embodiment of the present invention.

Embodiments of the present invention recognize that the tape drive is a linear system in which the width direction of the tape is divided into a plurality of areas (wraps), and data is recorded from the beginning to the end of the tape for even wraps and from the end to the beginning in the tape length direction for odd wraps. The width of the area in the tape width direction in which valid data for each Wrap is written is called the track pitch width of track pitch (Wtp). For example, even-numbered wraps record while traveling from the beginning to the end (forward), and odd-numbered wraps record while traveling from the end to the beginning (backward). In one particular example, 12.65 mm wide tape is divided into four data bands and in the case of the latest TS1160 tape drive, each data band is divided into 68 wraps, so the total number of tapes is 272, wherein the tape is divided into wrap areas. In this example, since one wrap is written on 32 tracks at the same time, there are 8704 data areas in the tape width direction, and the width of one track is about 1 micrometer (µm). Embodiments of the present invention recognize that when reading and writing data, in order to align the head position on this very narrow track, the servo patterns pre-written in the five servo bands are arranged so as to sandwich the data band. Embodiments of the present invention recognize that when the drive code can determine the track position that the head runs by the intervals of the signals from servo head which are independent from data head while travelling at a constant speed.

Embodiments of the present invention recognize that there are several issues in the art including the tape library containing multiple generations of tape drives. Embodiments of the present invention recognize that when a new generation tape drive is introduced, newly written data is written at high speed to a new generation tape drive that can record a large amount of data. On the other hand, the already written data is read from the old tape drive. Embodiments of the present invention recognize that as new data increases, the data to be read gradually shifts to new tape. Embodiments of the present invention recognize that even if access to old data is reduced, the old generation tape drive should be kept in the tape library as long as the data remains on the old generation tape.

Embodiments of the present invention recognize that it may be necessary to navigate about 1000 meters (m) from the beginning to the end of the tape in order to measure the width between the servo bands when initializing the tape. For example, if the tape runs at 6 meters per second (m/s), it will take approximately 4 minutes per tape, and when a large amount of new tape is inserted, the initialization of the tape will take considerably longer. Embodiments of the present invention recognize that when the highest priority recall request is received, if the tape storing the data is stored in the storage slot side and there is no free drive, the tape is ejected and read. Thus, embodiments of the present invention recognize that the drive needs to secure.

Embodiments of the present invention recognize that when ejecting the tape, the tape drive must be moved to the end of the tape media and rewound in order to reduce the tension of the tape. Additionally, embodiments of the present invention recognize that when it is necessary to eject the tape in order to read from other tapes in a hurry with recall, the operation (i.e., eject the tape in order to read from other tapes in a hurry with recall) may take up to 4 minutes. Embodiments of the present invention recognize that in order to reduce the required time, the latest tape drives have adopted mechanisms such as rewinding at high speed or rewinding only to the range that needs to be rewound, but even then, when rewinding was not performed, these adopted mechanisms take an incomparably long time, and countermeasures are urgently needed.

Embodiments of the present invention, improve the art by utilizing unused tape drives and improves efficiency by increasing rewind speed. In an environment where multiple generations of tape drives are installed in a tape library, embodiments of the present invention improves the art by: (i) writing, via a new generation tape drive, newly written data to one or more tape media; (ii) responsive receiving a read request, loading the tape media on which the data is recorded (i.e., tape media that comprises newly written data) onto a readable tape drive and executes the reading of the loaded tape media; (iii) recording or notifying the tape library, via the tape drive, that the tape media is in a predetermined condition when ejecting the tape media from the tape drive; (iv) managing, via the tape library, the tapes ejected from the tape drive, wherein the tape drives in the tape library, insert the managed tape into the tape drive that does not contain tape; and (v) performing a notification process, wherein the tape drive comprising tape media with specific conditions is inserted reads the specific conditions recorded on the tape media and performs the specified processing when the specific conditions are notified from the tape library. Specific conditions, for example, may be discharged with high tension and/or the distance between servo bands has not been measured after formatting. For example, procession requests such as but not limited to low tension rewind request and/or distance measurement request between servo bands may be considered as processing requests issued from the tape library. Embodiments of the present invention may notify the tape library of specific conditions, while tape library manages the tapes ejected from the tape drive, insert the tape that meets the specific conditions into the drive that does not contain tape and notify the drive of specific conditions.

Embodiments of the present invention improve the art by applying effective use of tape drive of low use frequency, reducing of time spent for recall owing to sharing of time-consuming process, and extending tape life owing to implementation of time-consuming process which is otherwise suppressed. Here, the time-consuming process refers to the process in the mechanism for reducing tape tension by winding tape media(s) 132 to the end and rewinding tape media(s) 132 therefrom, and in the mechanism for measuring a width between servo bands at tape initialization by moving up and down tape media(s) 132 from the beginning to the end for about 1000 m, which takes about 4 minutes at maximum per tape.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

Implementation of embodiments of the invention may take a variety of forms, and exemplary implementation details are discussed subsequently with reference to the Figures (i.e., FIG. 1-FIG. 9).

FIG. 1 illustrates a functional block diagram of a computing environment 100, in accordance with an embodiment of the present invention. Computing environment 100 comprises communication device 110, computer system 120 and tape drive $130_{1-N}$, herein after tape drives(s) 130, communication device 110 and computer system 120 can be desktop computers, laptop computers, specialized computer servers, or the like. As used herein, N represents a positive integer, and accordingly the number of scenarios implemented in a given embodiment of the present invention is not limited to those depicted in FIG. 1. In certain embodiments, communication device 110, computer system 120 and tape drive(s) 130 represent computer systems utilizing clustered computers and components acting as a single pool of seamless resources via network 140. For example, such embodiments can be used in data center, cloud computing, storage area network (SAN), and network attached storage (NAS) applications. In general, communication device 110, computer system 120 and tape drive(s) 130 are representative of any electronic devices, or combination of electronic devices, capable of executing computer readable program instructions, as described in detail with regard to FIG. 9.

In one embodiment of the present invention, communication device 110 comprises user application(s) 112. user application(s) 112 can be a plurality of user application(s) 112 within communication device 110. user application(s) 112 can be an application used to perform operations such as, but not limited to, operation of selective LTFS mounting, viewing and exploring mounted file/directory structures from LTFS tape media within computing environment 100. In embodiments of the present invention, user application(s) 112 can comprise any combination of commercial or custom devices and/or software products associated with operating selective LTFS tape mounting.

In some embodiments of the present invention, communication device 110 may be, but is not limited to, a stand-alone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 140 or any combination therein. In general, communication device 110 may be representative of any programmable computing device or a combination of programmable computing devices capable of executing machine-readable program instructions and communicating with users of other computing devices via network 140 and/or capable of executing machine-readable program instructions and communicating with computer system 120. In some embodiments communication device 110 may represent a plurality of computing devices.

In some embodiments of the present invention, communication device 110 may represent any programmable electronic computing device or combination of programmable electronic computing devices capable of executing machine readable program instructions, manipulating executable machine-readable instructions, and communicating with computer system 120 and other computing devices (not shown) within distributed data processing environment 100 via a network, such as network 140. Communication device 110 may include an instance of user interface (interface), and local storage, not depicted in FIG. 1. In various embodiments, not depicted in FIG. 1, communication device 110 may have a plurality of interfaces. In other embodiments, not depicted in FIG. 1, distributed data processing environment 100 may comprise a plurality of computing devices, plurality of server computers, and/or one a plurality of networks. Communication device 110 may include internal and external hardware components, as depicted, and described in further detail with respect to FIG. 9.

Network 140 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 140 may include one or more wired and/or wireless networks that may receive and transmit data, voice, and/or video signals, including multimedia signals that include voice, data, text and/or video data. In general, network 140 may be any combination of connections and protocols that will support communications between communication device 110 and computer system 120, and any other computing devices and/or storage devices (not shown in FIG. 1) within distributed data processing environment 100.

In one embodiment of the present invention, tape drive(s) 130 comprises tape media $132_{1-N}$, herein after tape media(s) 132. As used herein, N represents a positive integer, and accordingly the number of scenarios implemented in a given embodiment of the present invention is not limited to those depicted in FIG. 1. Tape drive(s) 130 can be a plurality of tape drive(s) 130 that can operate LTFS formatted tape media. In embodiments of the present invention, tape drive(s) 130 can comprise any combination of commercial or custom devices and/or software products associated with operating LTFS tape media.

In one embodiment of the present invention, tape media(s) 132 can be a plurality of tape media(s) 132 within tape drive(s) 130. tape media(s) 132 can be physical LTFS formatted tapes in forms such as, but not limited to, cartridges and tape reels. tape media(s) 132 can comprise any combination of commercial or custom devices adhering to LTFS or equivalent tape media standards.

In one embodiment of the present invention, computer system 120 comprises: rewinding tape media component (component) 122, mount memory 123 and tape library 124.

In one embodiment of the present invention, mount memory 123 can be a plurality of mount memories 123 within computer system 120. mount memory 123 can be system memory comprising information such as, but not limited to, file/directory structure and file data copied from tape media(s) 132 during tape library 124 operation.

In one embodiment of the present invention, tape library 124 can manage a plurality of tape drives (e.g., tape drive(s) 130) and a plurality of tape media (e.g., tape media(s) 132). In various embodiments of the present invention, component 122 enables the managing of tape library 124, wherein managing tape library 124 comprises managing one or more tape libraries 134 on a web interface (web I/F) and enable storage management programs that manage tape libraries, tape drives, and tape media on the host side. In another embodiment of the present invention, the web I/F operates and executes over network 140 and enables a user interface between communication device 110 and computer system 120. In embodiments of the present invention, tape library 124 can comprise any combination of commercial or custom devices and/or software products associated with operating tape media(s) 132 mounting.

In one embodiment of the present invention, tape library 124 comprises Arm 126 and slot storage 128. Arm 126 can retrieve and/or maneuver tape media(s) 132 between tape drive(s) 130 and slot storage 128. In another embodiment of the present invention, arm 126 is a programable mechanical arm as it is known and understood in the art. In embodiments of the present invention, arm 126 can comprise any combination of commercial or custom devices and/or software products associated with operating arm 126.

In various embodiments of the present invention, slot storage 128 is a slot storage repository as it is known and understood in the art. Slot storage 128 may comprise a plurality of storage slots that can store a plurality of tape media(s) 132. In some embodiments of the present invention, slot storage 128 comprises any combination of commercial or custom devices and/or software products associated with operating slot storage 128.

In the depicted embodiment, component 122 is executed on computer system 120. In other embodiments, component 122 executes on communication device 110. In various embodiments of the present invention, not depicted in FIG. 1, component 122 may execute on a plurality of computer system 120 and/or on a plurality of computing devices 110. In some embodiments, component 122 is located and/or executed anywhere within distributed data processing environment 100 as long as component 122 is connected to and/or communicates with, communication device 110, and/or computer system 120, via network 140.

In various embodiments of the present invention, tape drive(s) 130 understands, from the information recorded in the cartridge memory loaded onto tape media(s) 132, the amount of data recorded in tape media(s) 132 and the partition setting.

In various embodiments of the present invention, component 122 improves the art by enabling the rewinding of tape media(s) 132 at low tension and measuring a distance between servo bands with the use of unused or less frequently used tape drive(s) 130. In various embodiments of the present invention, new generation tape drive(s) 130, old-generation tape drive(s) 130, and a tape drive(s) 130 having a trouble in reading/writing user data due to deterioration of track in the data system but capable of reading servo signals with no difficulty may be used to rewind said tape media(s) 132 at low tension and measuring a distance between servo bands with the use of unused or less frequently. In various embodiments of the present invention, component 122 records and manages specific conditions in the cartridge memory (CM) of tape media(s) 132, though a mechanism for managing specific conditions in the tape library 124.

In various embodiments of the present invention, component 122 controls tape library 124 and manage and control tape drive(s) 130 and tape media(s) 132. In various embodiments of the present invention, a plurality of tape drive(s) 130 are determined for use in rewinding a tape media at low tension (low-tension rewind drive), wherein tape drive(s) 130 for use in rewinding are determined and selected from less used tape drives or recently unused tape drives. In various embodiments of the present invention, in unloading a tape which was read/written in the low-tension rewind drive, the tape is rewound at low tension. In various embodiments of the present invention, in unloading a tape which was read/written in other tape drive(s) 130, the tape is unloaded with high tension and without further processing. The unloaded tape is brought into a rewind required mode. In various embodiments of the present invention, when the low-tension rewind drive has no tape, one of the tapes brought into the rewind required mode is loaded into the low-tension rewind drive. In various embodiments of the present invention, component 122 instructs the low-tension rewind drive to rewind the tape at low tension or measure a distance between servo bands to record in CM of the tape. In various embodiments of the present invention, when the instructed process is completed, the tape is unloaded and returned to the original tape drive or storage slot and brought into a normal mode from the rewind required mode.

Figure 2:
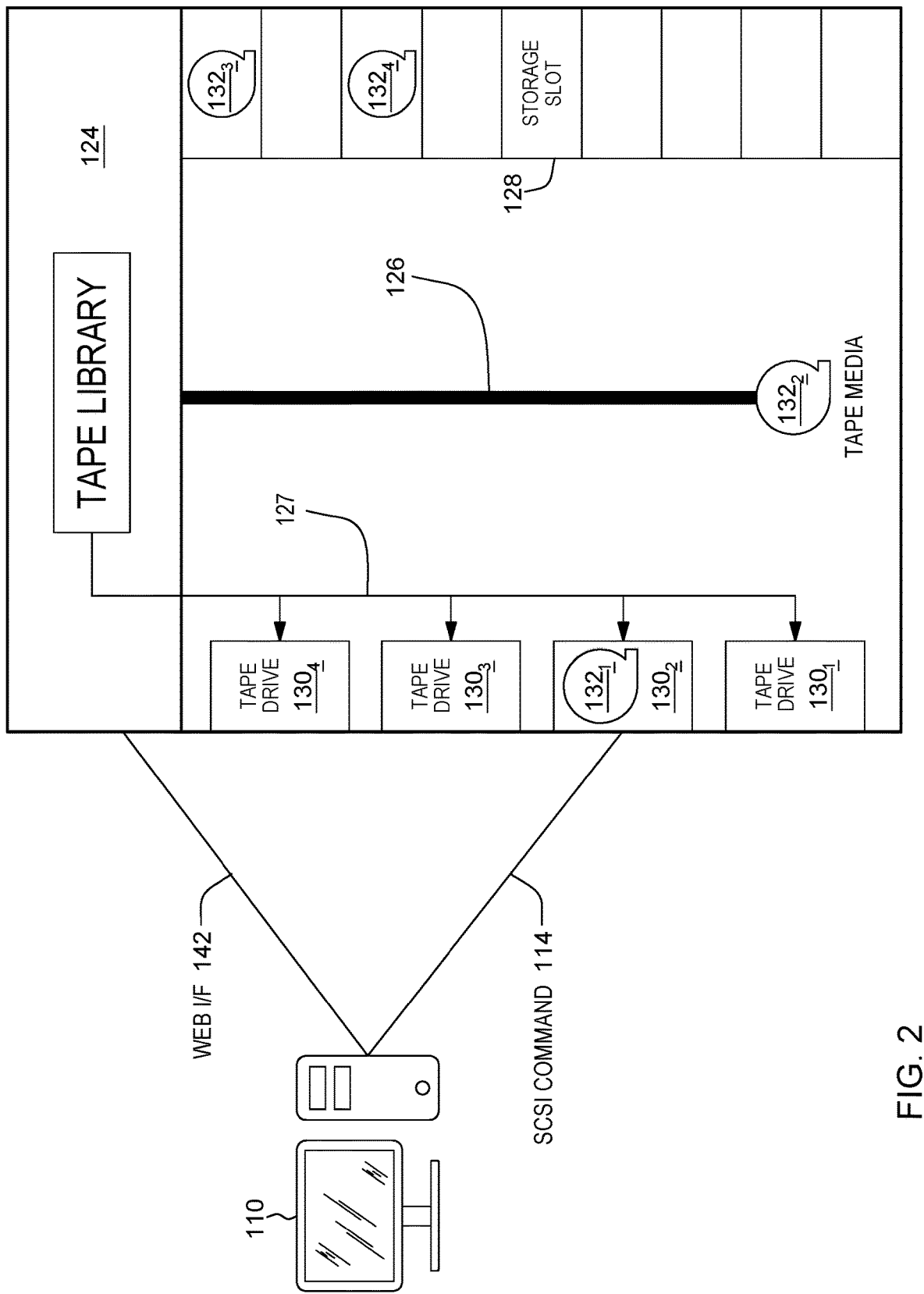
FIG. 2 depicts a functional block diagram of a computing environment, for rewinding a tape at low tension by measuring distance between servo bands utilizing unused/less frequently used tape drives in accordance with an embodiment of the present invention.

FIG. 2 illustrates a functional block diagram within distributed data processing environment 100 of FIG. 1, for rewinding a tape at low tension by measuring distance between servo bands utilizing unused/less frequently used tape drives, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, tape library 124 comprise arm 126, tape drive $130_1$, $130_2$, $130_3$, and $130_4$, slot storage 128, and tape media $132_1$, $132_2$, $132_3$, and $132_4$. In the depicted embodiment, communication device 110 communicates with tape library 124 via a web interface (i.e., web I/F 142) and small computer system interface (SCSI) command 114. In various embodiments of the present invention, arm 126 moves tape media(s) 132 between tape drive(s) 130 and slot storage 128. In various embodiments of the present invention, SCSI command 114 architecture defines parallel SCSI buses but can be carried forward with minimal change for use with Fibre Channel, internet small computer system interface (iSCSI), Serial Attached SCSI, and other transport layers. SCSI command 114 is an SCSI command as it is known and understood in the art.

In the depicted embodiment, tape library 124 enables a web interface (i.e., web I/F 142), wherein web I/F 142 provides communication and user interface (interface) between communication device 110 and tape library 124. Web I/F 142 enables the management of inventory of tape drive(s) 130 and tape media in the tape library 124 and move tape media(s) 132 through a host personal computer PC (e.g., communication device 110). In the depicted embodiment, tape library 124, via RS422 127 and arm, 126 move tape media(s) 132 to and from tape drive $130_1$, $130_2$, $130_3$, and/or $130_4$, wherein RS422 is a technical standard known in the art. In response to an instruction from the tape library 124 to move one or more tape media(s) 132, wherein the one or more tape media(s) 132 are unmounted from one or more tape drive (e.g., tape drive $130_1$, $130_2$, $130_3$, and/or $130_4$), and moved to one or more available storage slots in slot storage 128. In various embodiments of the present invention, the one or more available storage slots in slot storage 128 are predetermined. In the depicted embodiment, communication device 110, via SCSI command 114, writes data in tape drive(s) 130 to tape media(s) 132 and reads data written on tape media(s) 132.

For example, a user, via web I/F 142, can view the inventory of tape drives and tape media in tape library 124. In this example, the user identifies tape media $132_1$, on tape drive$_2$ and wants to move it to slot storage 128. In this example, tape library 124 receives a command, via SCSI command 114, to move tape media $132_1$ from tape drive$_2$ to an available slot in slot storage 128. In this example, tape library 124 unmounts tape media $132_1$ from tape drive$_2$ and executes an operation instructing arm 126 to retrieve tape media $132_1$ from tape drive$_2$ and move tape media $132_1$ to an available slot in slot storage 128.

Figure 3:
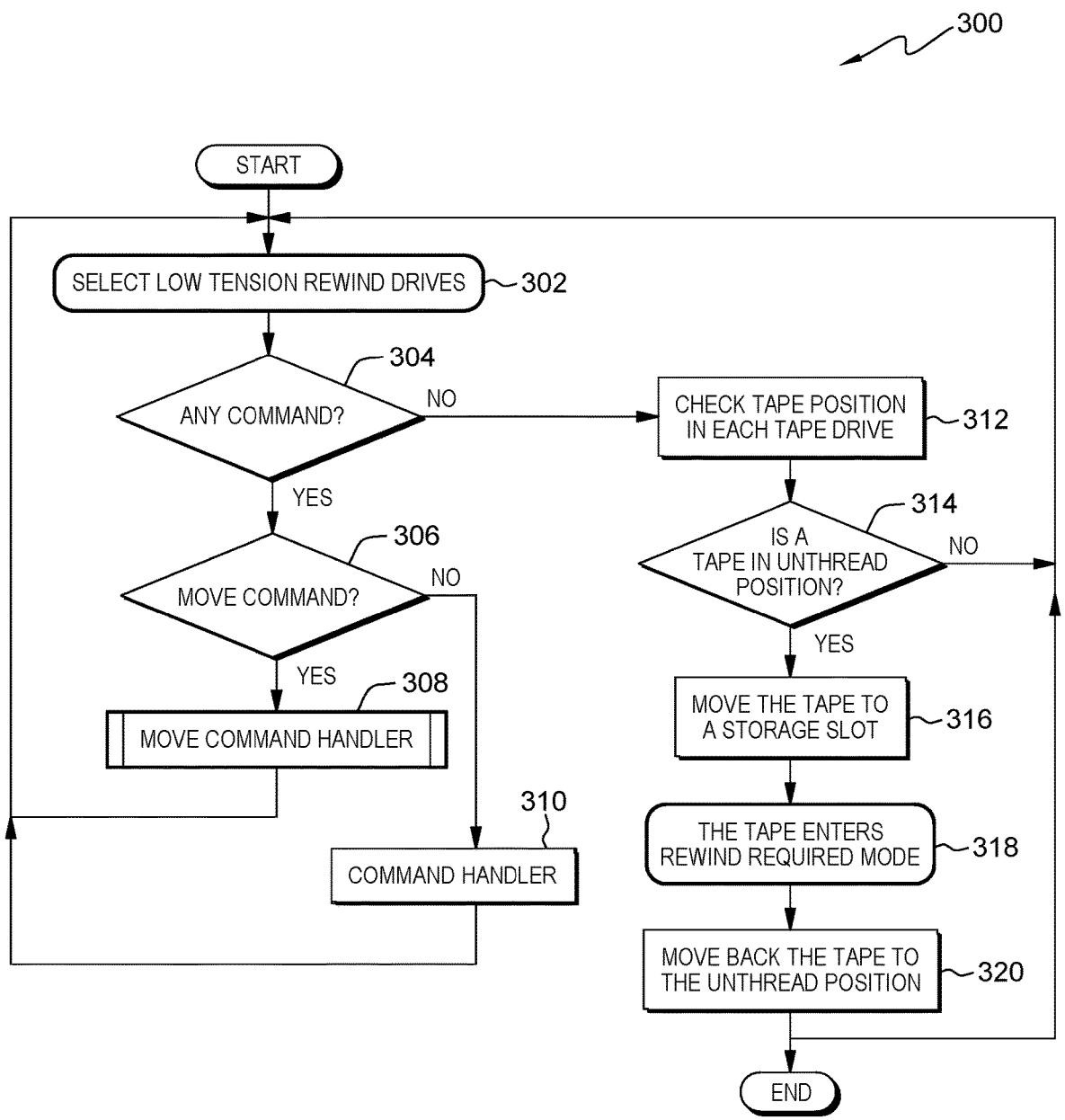
FIG. 3 illustrates operational steps of a rewinding tape media component, within the distributed data processing environment of FIG. 1, for command handling in a tape library, in accordance with an embodiment of the present invention.

FIG. 3 illustrates operational steps of component 122, generally designated 300, within distributed data processing environment 100 of FIG. 1, for command handling in tape library 124, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims. FIG. 3 shows an embodiment of the flow controlled by a tape library firmware to control one or more tape media(s) 132 requiring rewinding and one or more tape drive(s) 130 used for rewinding by the tape library 124.

In step 302, component 122 select's one or more tape drive(s) 130 for low tension rewind. In various embodiments of the present invention, one or more tape drive(s) 130 is selected, via a controller program manager (e.g., component 122), as the low-tension rewind drive among available tape drives in tape library 124. Various possible approaches for selection comprise, for example, selection of a tape drive with the lowest use frequency during the latest several days, selection of a tape drive with less occurrence of recall, and selection of a tape drive of the oldest generation.

In step 304, component 122 determines if a command has been received. In the depicted embodiment, component 122 determines if one or more commands have been received or issued. In the depicted embodiment, if component 122 determines no command has been received (No step) then component 122 will advance to step 314. In the depicted embodiment, if component 122 determines one or more commands have been received then (Yes step), then component 122 advances to step 308.

In step 306, component 122 determines if a received command is a move command. In the depicted embodiment, component 122 determines if one or more received commands are a move command. In various embodiments of the present invention, when tape media(s) 132 are moved to tape drives 130 slot storage 128 for storing in tape library 124, a move command is issued by component 122, via web I/F 142. In various embodiments of the present invention, tape library 124 has a command handler waiting for a command to be issued. In the depicted embodiment, if component 122 determines no move command has been received and/or executed (No step) then component 122 advances to step 312. In the depicted embodiment, if component 122 determines one or more of the received commands is a move command (Yes step) then component 122 advances to step 310.

In step 308, component 122 moves the command handler. In various embodiments of the present invention component 122 moves the command handler as further described in FIG. 4. In the depicted embodiment, component 122 returns to step 304 and continually executes the illustrated steps. In other embodiments, component 122 will move the command handler and end.

Figure 4:
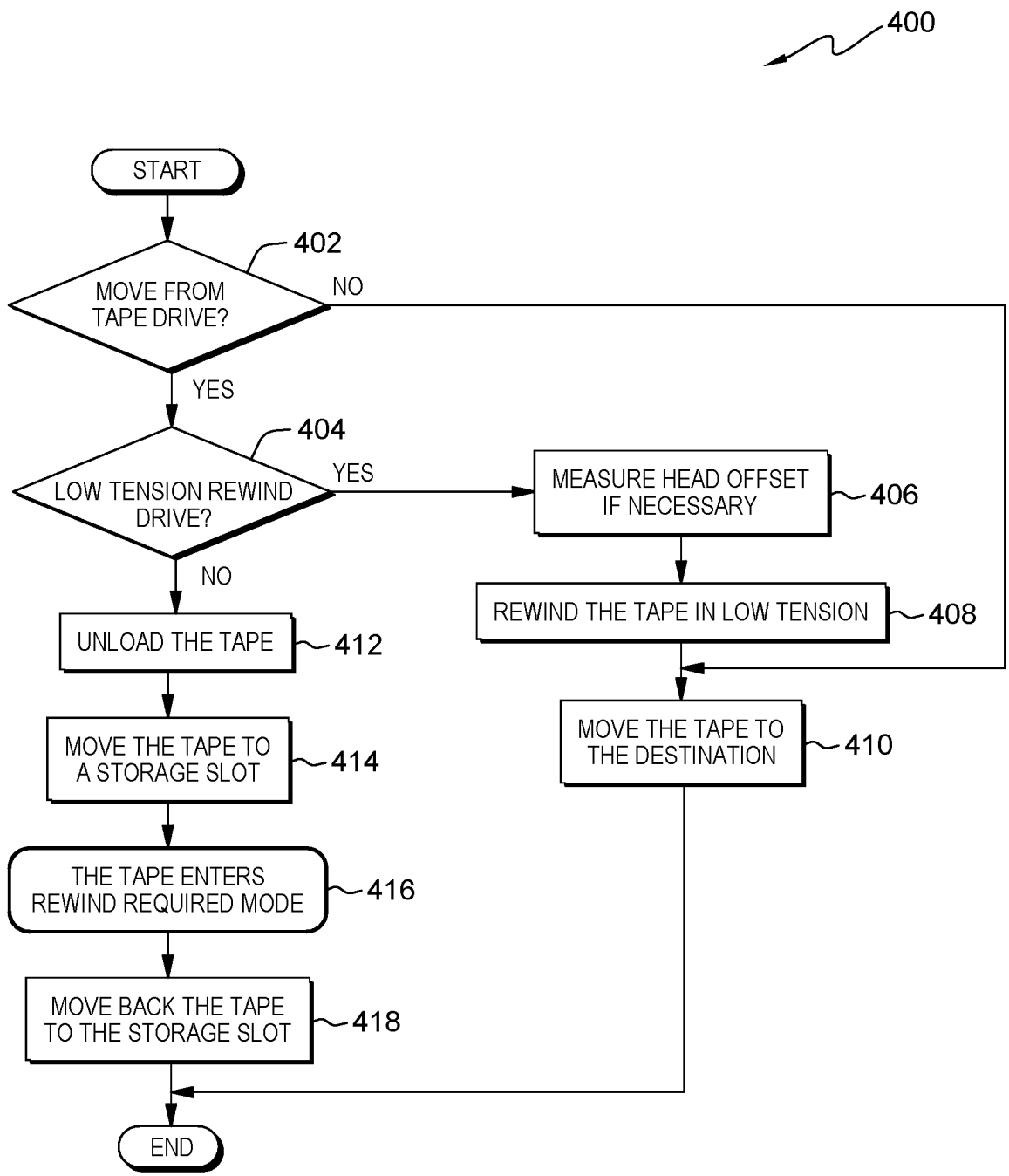
FIG. 4 illustrates operational steps of the rewinding tape media component, within the distributed data processing environment of FIG. 1, for a move command handler, in accordance with an embodiment of the present invention.

In step 310, component 122 initiates a command handler, as further described in FIG. 4. In various embodiments of the present invention, when no command is issued, tapes may slip through the handler periodically.

In step 312, component 122 checks tape media(s) 132 position in tape drive(s) 130. In various embodiments of the present invention, component 122 checks the tape position of one or more tape media(s) 132 in one or more tape drive(s) 130.

In step 314, component 122 determines if tape media(s) 132 is in unthread position in tape drive(s) 130. In various embodiments of the present invention, component 122 determines if one or more tape media(s) 132 are in an unthread position. In the depicted embodiment, if component 122 determines no tape media(s) 132 are in an unthread position (No step) the component 122 returns to step 304. In the depicted embodiment, if component 122 determines one or more tape media(s) 132 are in an unthread position (Yes step) then component 122 advances to step 318. If a tape which is disposed at an unthread position and not brought into the rewind required mode is found in any tape drive in the tape library 124, the tape is brought into the rewind required mode ("The tape enters rewind required mode" step).

In step 316, component 122 moves tape media(s) 132 to slot storage 128. In various embodiments of the present invention, component 122 moves, via arm 126, one or more tape media(s) 132 that are in unthread position in one or more tape drive(s) 130 to one or more available storage slots in slot storage 128. In various embodiments of the present invention, component 122 labels the one or more moved tape media(s) 132 to indicate a rewind is required.

In step 318, component 122 enters tape media(s) 132 into rewind required mode. In various embodiments of the present invention, component 122 enters one or more tape media(s) 132 moved to slot storage 128 into rewind required mode. In various embodiments of the present invention, component 122 enters one or more tape media(s) 132 based on the label in step 318.

In step 320, component 122 moves tape media(s) 132 back into the unthread position. In various embodiments of the present invention, component 122 moves one or more tape media(s) 132 back into the untread position after being rewound and/or entered into rewind required mode. In other embodiments not depicted in FIG. 3, component 122 continuously repeats steps 302-320.

FIG. 4 illustrates operational steps of component 122, generally designated 400, within distributed data processing environment 100 of FIG. 1, for move command handler described in FIG. 3, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims. In the embodiment of FIG. 4, when a tape is moved from a tape drive to a storage slot in response to the move command, the tape is brought into the rewind required mode ("The tape enters rewind required mode" step). In the depicted embodiment, the steps below further describe step 310 above.

In step 402, component 122 determines if tape media(s) 132 should be moved from tape drive(s) 130. In various embodiments of the present invention, component 122 determines if one or more tape media(s) 132 should be moved from one or more tape drive(s) 130, respectively. In FIG. 3, tape library 124 receives a move command from the host. The move command moves tape media(s) 132 between tape drive(s) 130 and slot storage 128. In various embodiments of the present invention, component 122 checks whether the move command issued by the host attempts to move one or more tape media(s) 132 from one or more tape drive(s) 130 or not. In the depicted embodiment, if component 122 determines no tape media(s) 132 should be moved from tape drive(s) 130 (No step) then component 122 advances to step 412. In the depicted embodiment, if component 122 determines one or more tape media(s) 132 should be moved from tape drive(s) 130 (Yes step) then component 122 advances to step 406.

In step 404, component 122 determines if tape media(s) 132 is from a low tension rewind tape drive(s) 130. In various embodiments of the present invention, component 122 determines if one or more tape media(s) 132 are from one or more low tension rewind tape drive(s) 130. In the depicted embodiment, if component 122 determines no tape media(s) 132 are from low tension rewind tape drive(s) 130 (No step) then component 122 advances to step 414. In the depicted embodiment, if component 122 determines one or more tape media(s) 132 are from low tension rewind tape drive(s) 130 (Yes step) then component 122 advances to step 414.

In step 406, component 122 measures the head offset. In various embodiments of the present invention, component 122 measures the head offset, wherein the head offset is the distance between servo bands. For example, two servo heads are attached; one is edge size of the head 1 and another is the edge size of the head 32. Using these two heads, the drive reads the stripes in servo band to determine the vertical position of each servo head, wherein the head offset shows the distance between them.

In step 408, component 122 rewinds tape media(s) 132 in low tension. In various embodiments of the present invention, component 122 rewinds one or more tape media(s) 132 by low tension rewind. Tape media(s) 132 may have a cartridge memory which stores the information about the tape tension. In this case, tape drive(s) 130 knows which part of the tape media(s) 132 is rewound at high tension and which part of the tape is rewound at low tension. Tape drive(s) 130 wind tape media(s) 132 until the tape tension is low tension or at the end of tape media(s) 132, then rewinds back tape media(s) 132 in low tension.

In step 410, component 122 moves tape media(s) 132 to the destination. A move command specifies a source slot or a source tape drive in which one or more tape media(s) 132 is stored, and also specifies the destination storage slot in slot storage 128 or tape drive(s) 130 that tape drive(s) 130 is instructed to move to, wherein the destination is the target storage slot in slot storage 128 or tape drive(s) 130 designated by the move command. In various embodiments of the present invention, component 122 moves, via arm 126, one or more tape media(s) 132 to the destination. In various embodiments of the present invention, the destination is predetermined. In the depicted embodiment, component 122 ends the move command.

In step 412, component 122 unloads tape media(s) 132. In various embodiments of the present invention, component 122 unloads one or more tape medias 132 from one or more tape drive(s) 130 that are not low tension rewinds, respectively.

In step 414, component 122 moves tape media(s) to slot storage 128. In various embodiments of the present invention, component 122 moves, via arm 126, one or more tape media(s) to one or more available storage slots in slot storage 128.

In step 416, component 122 enters tape media(s) 132 into rewind required mode. In various embodiments of the present invention, component 122 enters one or more tape media(s) 132 into a rewind required mode.

In step 418, component 122 returns tape media(s) 132 into slot storage 128. In various embodiments of the present invention, component 122 returns, via arm 126, the one or more tape media(s) 132 entered into the rewind required mode. In the depicted embodiment, responsive to returning tape media(s) 132 to slot storage 128, component 122 ends the move command. In various embodiments of the present invention, the move command moves a tape from a slot in slot storage 128 or from tape drive(s) 130 to a different storage slot or a different tape drive(s) 130, wherein tape media(s) 132 was in the source location of the move command.

Figure 5:
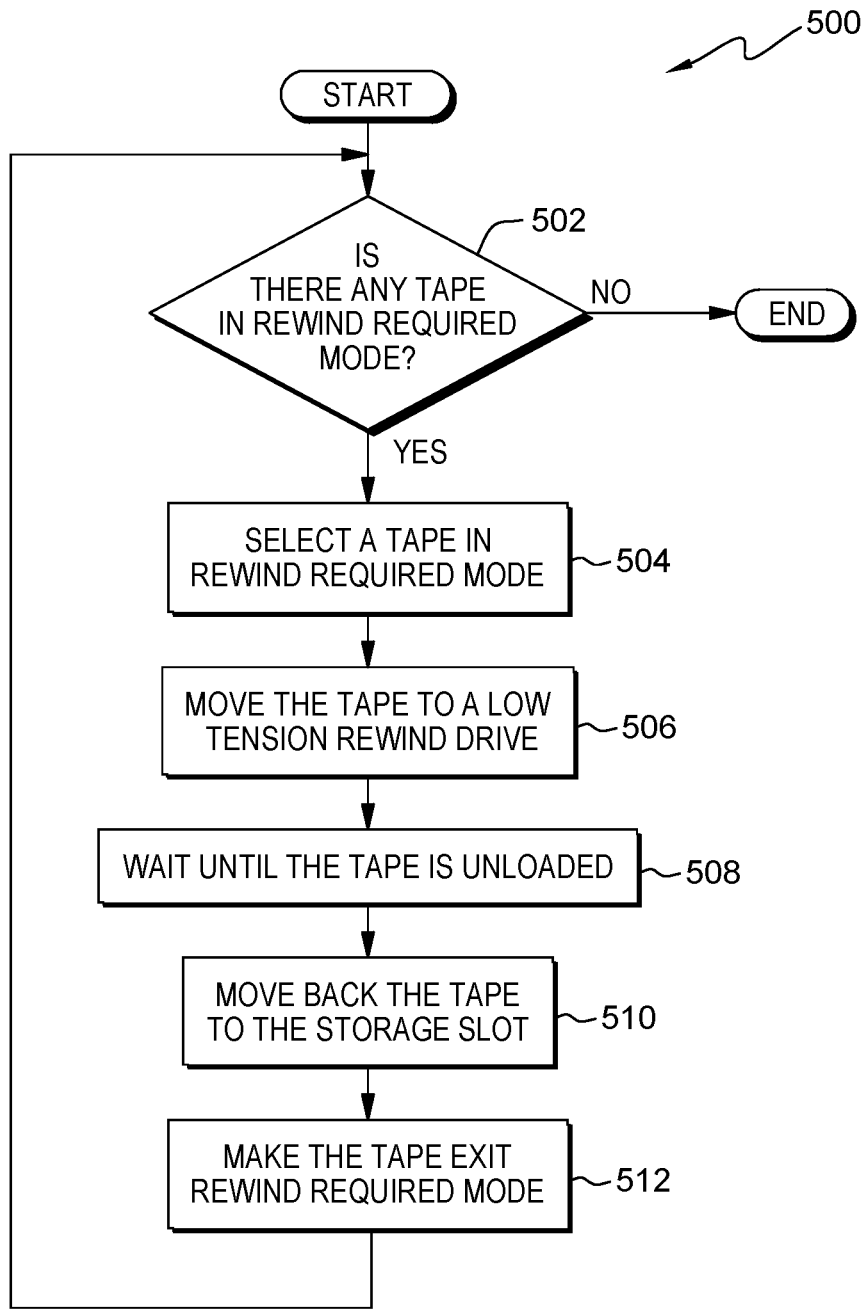
FIG. 5 illustrates operational steps of the rewinding tape media component, within the distributed data processing environment of FIG. 1, for rewind require mode, in accordance with an embodiment of the present invention.

FIG. 5 illustrates operational steps of component 122, generally designated 500, within distributed data processing environment 100 of FIG. 1, for rewind require mode, in accordance with an embodiment of the present invention. FIG. 5 provides an illustration of one implementation and does not imply any limitations with regard to the environments in which different embodiments may be implemented. Many modifications to the depicted environment may be made by those skilled in the art without departing from the scope of the invention as recited by the claims. In this particular embodiment, the tape which was brought into the rewind required mode at "the tape enters rewind required mode" step shown in FIG. 3 and FIG. 4 is processed by tape library 124 according to the procedure shown in FIG. 5.

In step 502, component 122 determines if there are any tape media(s) 132 in rewind required mode. In various embodiments of the present invention, component 122 determines if one or more tape media(s) 132 have been entered into rewind required mode. In the depicted embodiment, if component 122 determines no tape media 132 has entered into rewind required mode (No step) then component 122 ends the rewind required mode. In the depicted embodiment, if component 122 determines one or more tape media(s) 132 have been entered into rewind required mode (Yes step) then component 122 advances to step 504.

In step 504, component 122 selects one or more tape media(s) 132 in rewind required mode. In various embodiments of the present invention, component 122 selects one or more tape media(s) in slot storage 128 that are determined to be in rewind required drive.

In step 506, component 122 moves one or more tape media(s) to one or more low tension rewind tape drive(s) 130. In various embodiments of the various embodiments, component 122, via arm 126, moves one or more tape media(s) 132 selected from the identified tape media(s) 132 in rewind required mode to one or more low tensions rewind drive (e.g., identified low tension rewind tape drive(s) 132).

In step 508, component 122 waits until one or more tape media(s) 132 are unloaded from one or more tape drive(s) 130. In various embodiments of the present invention, component 122 tracks one or more tape media(s) 132 rewind rate on one or more low tension rewind tape drives 132 and waits until the one or more tape media(s) are unloaded by one or more tape drive(s) 130 before executing a subsequent action.

In step 510, component 122 moves one or more tape media(s) back to slot storage 128. In various embodiments of the present invention, component 122 moves, via arm 126, one or more tape media(s) to one or more available storage slots in slot storage 128 after one or more tape media 132 are unloaded.

In step 512, component 122 removes one or more tape media(s) 132 from rewind require mode. In various embodiments of the present invention, component 122 removes one or more tape media(s) 132 from rewind required mode and/or any rewind required mode labels assigned to one or more tape media(s) 132. In the depicted embodiment component 122 continually repeats steps 502-512. In other embodiments, component 122 ends and/or exits the rewind required mode.

Figure 6:
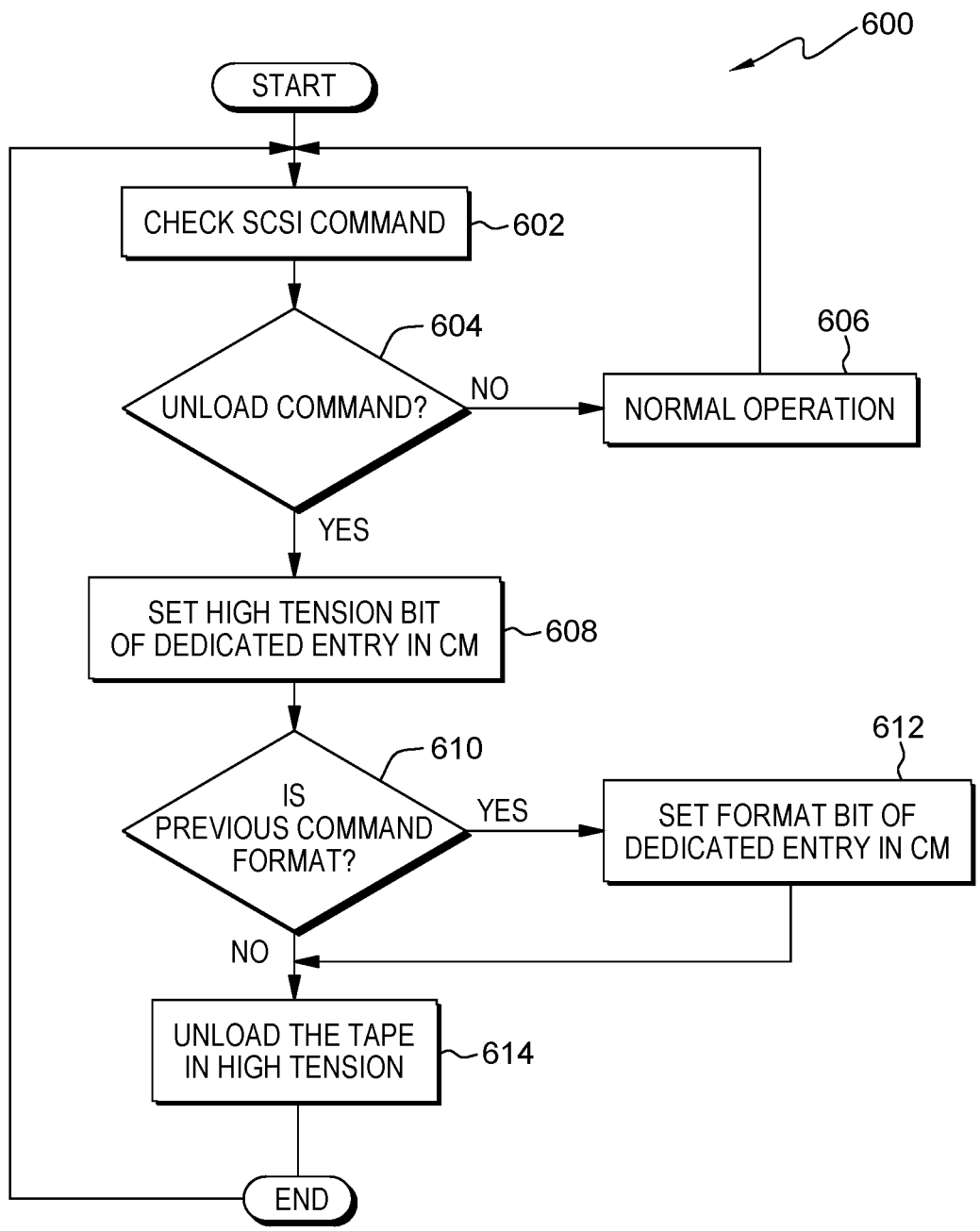
FIG. 6 illustrates operational steps of the rewinding tape media component, within the distributed data processing environment of FIG. 1, for operation by new-generation tape drive, in accordance with an embodiment of the present invention.

FIG. 6 illustrates operational steps of component 122, generally designated 600, within distributed data processing environment 100 of FIG. 1, for operation by new-generation tape drive, in accordance with an embodiment of the present invention. FIG. 6 provides an illustration of one implementation and does not imply any limitations with regard to the environments in which different embodiments may be implemented. Many modifications to the depicted environment may be made by those skilled in the art without departing from the scope of the invention as recited by the claims.

In various embodiments of the present invention, a host PC (i.e., communication device 110) or the tape library 124 uses a command such as Mode Page to set tape media(s) 132 drive to operate under a library environment in which the proposed mechanism is supported. In various embodiments of the present invention, when one or more tape drive(s) 130 is in the proposed mode, it operates as follows. Tape drive(s) 130 may unload tape media(s) 132 without rewinding tape media(s) 132 at low tension as performed in usual unloading. Tape drive(s) 130 may also unloads tape media(s) 132 without measuring a distance between servo bands when receiving an unload request after a format command.

At that time, information of certain operation omitted in unloading tape media(s) 132 is recorded in a processing area dedicated to servo information in CM of tape media(s) 132. One or more tape media(s) 132 comprising information recorded therein may be read upon occurrence of recall but not selected in writing. However, it is undeniable that such tape media(s) 132 is written when there is no free tape. More specifically, this process is carried out according to the procedure shown in FIG. 6.

In step 602, component 122 checks SCSI command 114. In various embodiments of the present invention, component 122 checks one or more received SCSI commands 114 from communication device 110.

In step 604, component 122 determines if an unload command has been received. In various embodiments of the present invention, component 122 determines if one or more unload commands have been received from one or more tape drive(s) 130 and/or communication device 110. In the depicted embodiment, if component 122 determines no unload command has been received (No step) then component 122 advances to step 606. In the depicted embodiment, if component 122 determines one or more unload command have been received (Yes step) then component 122 advances to step 608.

In step 606, component 122 executes normal operation. In various embodiments of the present invention, component 122 executes one or more received normal operations, wherein normal operations are any operations known in the art that are not unload commands.

In step 608, component 122 sets high tension bit of dedicated entry in CM. In various embodiments of the present invention, the CM stores a variety of information in one or more separated entries (or pages). In this case, the high tension bit is stored in a page which stores variety of servo controller related information.

In step 610, component 122 determines if one or more previous commands are "Format" command. In various embodiments of the present inventions, component 122 determines if one or more previous commands are SCSI command 114 (e.g., "Format" command). In the depicted embodiment, if component 122 determines if the previous command is not format command (No step) then component 122 advances to step 614. In the depicted embodiment, if component 122 determines if the previous command is format command (No step) then component 122 advances to step 614.

In step 612, component 122 sets format bit of dedicated entry in CM. In various embodiments of the present invention, component 122 sets one or more format bits of the dedicated entry in a CM, wherein the dedicated entry is a CM page that stores servo related information.

In step 614, component 122 unloads tape media(s) 132 in high tension. In various embodiments of the present invention, component 122 unloads one or more tape media(s) 132 in high tension. In the depicted embodiment component 122 continually executes steps 602-614. In other embodiments, component 122 ends execution of steps 602-614.

Figure 7:
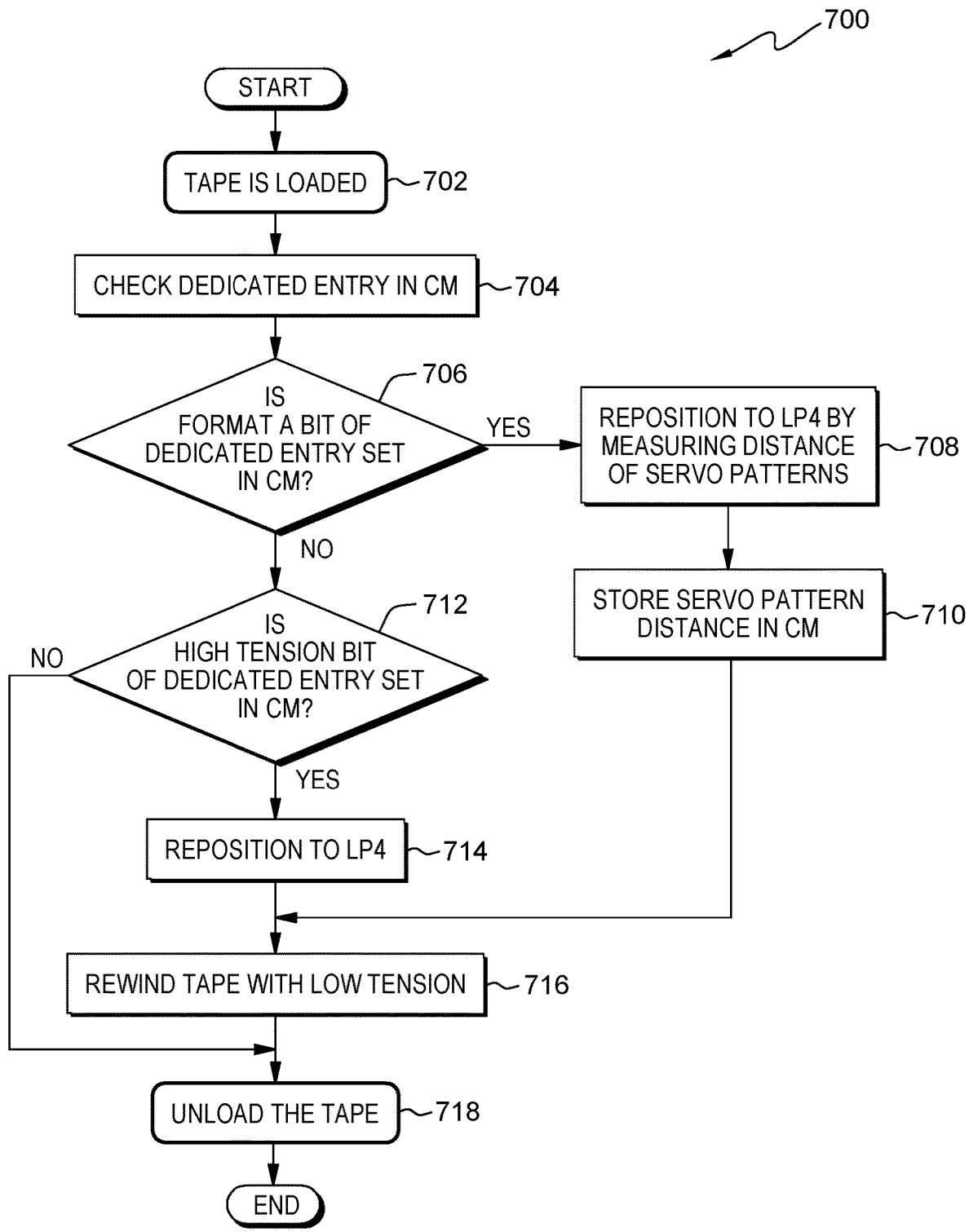
FIG. 7 illustrates operational steps of the rewinding tape media component, within the distributed data processing environment of FIG. 1, for operations by a dedicated tape drive, in accordance with an embodiment of the present invention.

FIG. 7 illustrates operational steps of component 122, generally designated 700, within distributed data processing environment 100 of FIG. 1, for operations by a dedicated tape drive, in accordance with an embodiment of the present invention. FIG. 7 provides an illustration of one implementation and does not imply any limitations with regard to the environments in which different embodiments may be implemented. Many modifications to the depicted environment may be made by those skilled in the art without departing from the scope of the invention as recited by the claims. FIG. 7 illustrates operation in low tension rewind drive in step 506.

In various embodiments of the present invention, the low-tension rewind drive (i.e., one or more tape drive(s) 130), discussed in step 506, checks the processing area dedicated to servo control in CM when a tape is loaded. If there is no record, the low-tension rewind drive unloads tape media(s) 132 without further processing. If there is a record as shown below for processing dedicated to servo, the low-tension rewind drive executes such process and then unloads tape media(s) 132. Processes executed comprise: low tension rewind request and/or distance measurement request between servo bands. More specifically, this process is carried out according to the procedure shown below in FIG. 7.

In step 702, component 122 loads one or more tape media 132. In various embodiments of the present invention, component 122 loads one or more tape media(s) 132 to one or more tape drive(s) 130.

In step 704, component 122 checks dedicated entry in CM. In various embodiments of the present invention, component 122 checks one or more dedicated entry in CM.

In step 706, component 122 determines if the format bit of the dedicated entry is set in CM. In the depicted embodiment, if component 122 determines the format bit of the dedicated entry is not set in the CM (No step) then component 122 advances to step 712. In the depicted embodiment, if component 122 determines the format bit of the dedicated entry is set in the CM (Yes step) then component 122 advances to step 708.

In step 708, component 122 repositions tape media(s) 132 to the $4^{th}$ logic point (LP4) by measuring distance of servo patterns. In various embodiments of the present invention, component 122 repositions tape media(s) 132 to LP4 based on the measured distance of the servo patterns, where LP4 is the end of the forward wrap or the beginning of the backward wrap on tape media(s) 132, and wherein the beginning of the forward wrap is referred to as the 3rd logic point LP3.

In step 710, component 122 stores servo pattern distance in the CM. In various embodiments of the present invention, component 122 stores one or more measured servo pattern distances in the CM.

In step 712, component 122 determines if the high tension bit of dedicated entry is set in the CM. In the depicted embodiment, if component 122 determines the high tension bit of the dedicated entry is not set in the CM (No step) then component 122 advances to step 718. In the depicted embodiment, if component 122 determines the high tension bit of the dedicated entry is set in the CM (Yes step) then component 122 advances to step 714.

In step 714, component 122 repositions tape media(s) 132 to LP4. In various embodiments of the present invention, component 122 repositions tape media(s) 132 to LP4, wherein reposition comprises locating and navigating to a target position (e.g., LP4) on tape media(s) 132. In this case, component 122, via tape drive(s) 130, winds the tape until the position of LP4 is reached.

In step 716, component 122 rewinds tape media(s) 132 with low tension. In various embodiments of the present invention, component 122 rewinds one or more tape media(s) 132 with low tension via one or more tape drive(s) 130.

In step 718, component 122 unloads tape media(s) 132. In various embodiments of the present invention, component 122 unloads one or more tape media(s) 132.

It is described in the present invention that a tape held in any tape drives except for the low-tension rewind drive is always unloaded with high tension for simplification. However, these tape drives may also rewind tape media(s) 132 at low tension as in the conventional manner for the purpose of unloading tape media(s) 132 except for the case of reading data from another tape urgently.

Figure 8:
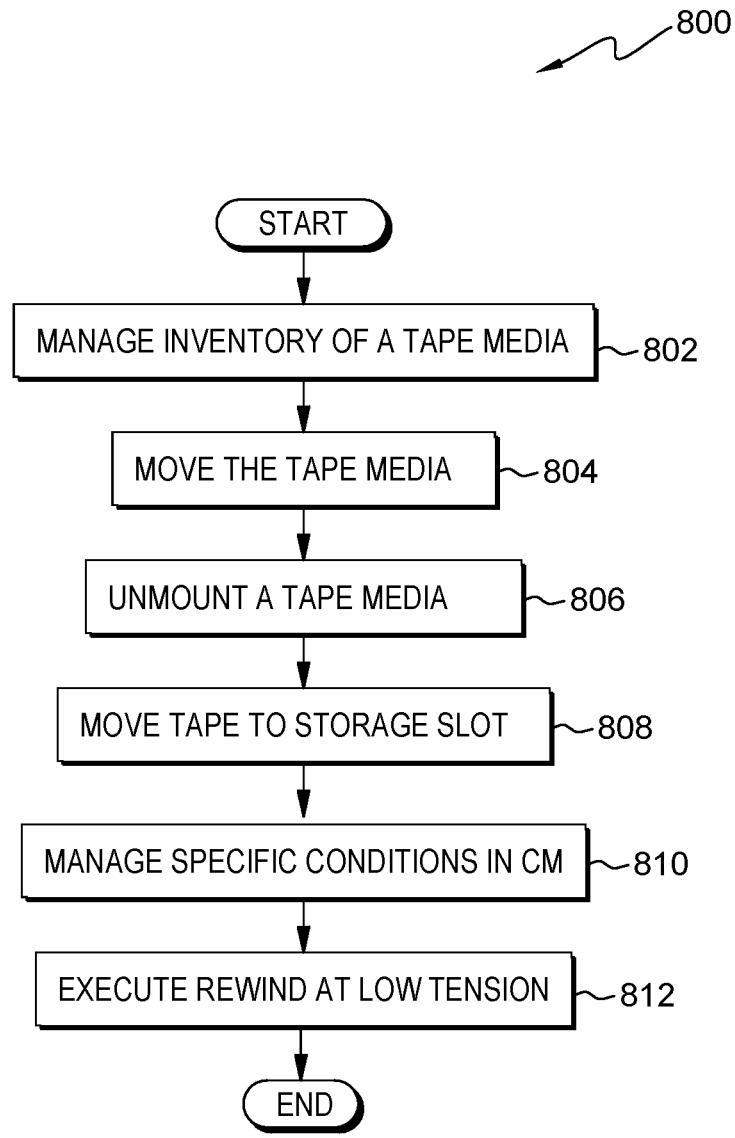
FIG. 8 illustrates operational steps of the rewinding tape media component, within the distributed data processing environment of FIG. 1, for rewinding a tape at low tension by measuring distance between servo bands utilizing unused/less frequently used tape drives, in accordance with an embodiment of the present invention.

FIG. 8 illustrates operational steps of component 122, generally designated 800, within distributed data processing environment 100 of FIG. 1, for rewinding a tape at low tension by measuring distance between servo bands utilizing unused/less frequently used tape drives, in accordance with an embodiment of the present invention. FIG. 8 provides an illustration of one implementation and does not imply any limitations with regard to the environments in which different embodiments may be implemented. Many modifications to the depicted environment may be made by those skilled in the art without departing from the scope of the invention as recited by the claims.

In step 802, component 122 manages inventory of one or more tape media(s) 132. In various embodiments of the present invention, component 122, via web I/F provided by tape library 124, manages the inventory of tape drive(s) 130 and tape media(s) 132 in tape library 124.

In step 804, component 122 moves one or more tape media(s) 132. In various embodiments of the present invention, component 122, via a host computer (i.e., communication device 110) and/or arm 126, moves one or more tape media(s) 132 to and from tape drive(s) 130 and/or slot storage 128.

In step 806, component 122 unmounts tape media(s) 132 from tape drive(s) 130. In various embodiments of the present invention, component 122 unmounts one or more tape media(s) 132 from one or more tape drive(s) 130.

In step 808, component 122 moves tape media(s) 132 to slot storage 128. In various embodiments of the present invention, component 122 moves, via arm 126, one or more tape media(s) 132 to one or more available storage slots in storage slot based on instruction from the tape library 124.

In step 810, component 122 manages specific conditions in the CM. In various embodiments of the present invention, component 122 records and manages specific conditions may be high tension discharge and no distance measurement after formatting in CM of the tape media(s) 132 by measuring the distance between servo bands utilizing unused tape drive(s) 130, wherein unused tape drive(s) 130 may be low frequency tape drives such as, old generation tape drives and tape drives having trouble in reading/writing a user's data due to deterioration of tracks in a data system but capable of reading servo signals without difficulty.

In step 812, component 122 executes rewind at low tension. In various embodiments of the present invention, component 122 executes rewind at low tension using one or more unused tape drive(s) 130.

Figure 9:
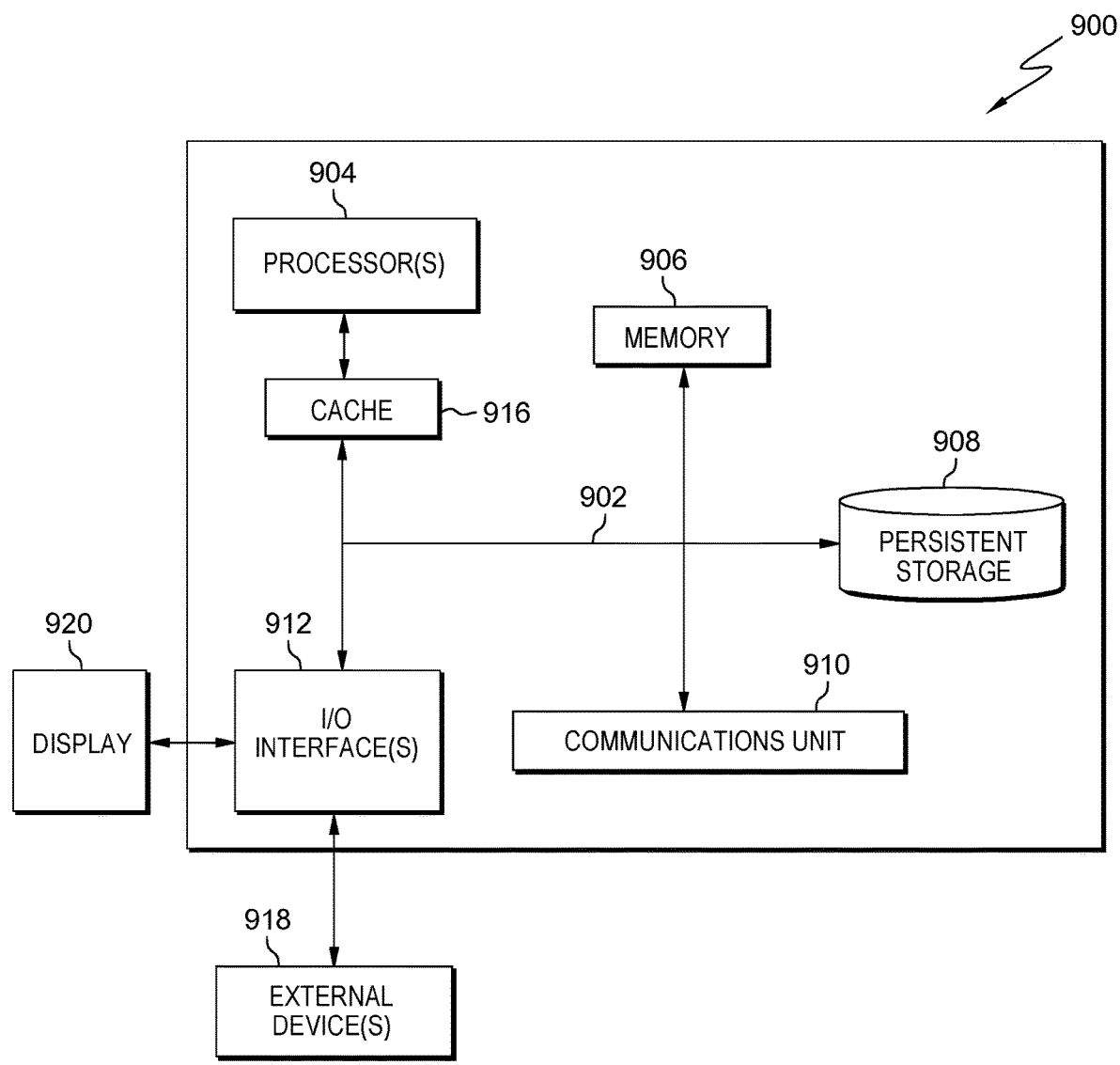
FIG. 9 illustrates a block diagram of components of the server executing the rewinding tape media component, within the distributed data processing environment of FIG. 1, in accordance with an embodiment of the present invention.

FIG. 9 illustrates a block diagram of components of communication device 110, computer system 120 and tape drive 130 in accordance with an illustrative embodiment of the present invention. It should be appreciated that FIG. 9 provides only an illustration of one implementation and does not imply any limitations with regard to the environments in which different embodiments may be implemented. Many modifications to the depicted environment may be made.

FIG. 9 depicts computer system 900, where computer system 120 represents an example of computer system 900 that includes component 122. Computer system 900 includes communications fabric 902, which provides communications between computer processor(s) 904, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Computer system 900 includes processors 904, cache 916, memory 906, persistent storage 908, communications unit 910, input/output (I/O) interface(s) 912 and communications fabric 902. Communications fabric 902 provides communications between cache 916, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses or a crossbar switch.

Memory 906 and persistent storage 908 are computer readable storage media. In this embodiment, memory 906 includes random access memory (RAM). In general, memory 906 can include any suitable volatile or non-volatile computer readable storage media. Cache 916 is a fast memory that enhances the performance of processors 904 by holding recently accessed data, and data near recently accessed data, from memory 906.

Program instructions and data used to practice embodiments of the present invention may be stored in persistent storage 908 and in memory 906 for execution by one or more of the respective processors 904 via cache 916. In an embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 910, in these examples, provides for communications with other data processing systems or devices. In these examples, communications unit 910 includes one or more network interface cards. Communications unit 910 may provide communications through the use of either or both physical and wireless communications links. Program instructions and data used to practice embodiments of the present invention may be downloaded to persistent storage 908 through communications unit 910.

I/O interface(s) 912 allows for input and output of data with other devices that may be connected to each computer system. For example, I/O interface 912 may provide a connection to external devices 918 such as a keyboard, keypad, a touch screen, and/or some other suitable input device. External devices 918 can also include portable computer readable storage media such as, for example, thumb drives, portable optical or magnetic disks, and memory cards. Software and data used to practice embodiments of the present invention can be stored on such portable computer readable storage media and can be loaded onto persistent storage 908 via I/O interface(s) 912. I/O interface(s) 912 also connect to display 920.

Display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for rewinding one or more tape media at low tension, the computer-implemented method comprising:
   managing, by a web interface provided by a tape library, an inventory of one or more tape drives and the one or more tape media in the tape library;
   recording high tension discharge and distance measurement after formatting in a cartridge memory of the one or more tape media in the tape library;
   managing the high tension discharge and the distance measurement after formatting in the cartridge memory of the one or more tape media by measuring a distance between servo bands utilizing one or more unused tape drives and one or more low frequency tape drives in the tape library; and
   executing a rewind at low tension using the one or more unused tape drive and the one or more low frequency tape drives.

2. The computer-implemented method of claim 1, further comprising:
   moving the one or more tape media through a host computer;
   unmounting the one or more tape media from the one or more tape drives; and
   moving, by an arm, one or more tape media to a predetermined slot in a slot storage repository.

3. The computer-implemented method of claim 2, wherein moving, by the arm, one or more tape media to the predetermined slot in the slot storage further comprises moving one or more tape media to a predetermined slot upon instruction from the tape library, and using a small computer system interface (SCSI) command by the host computer to read from and write to the one or more tape media.

4. The computer-implemented method of claim 1, wherein the one or more unused tape drives and low frequency tape drives comprise: one or more old generation tape drives and one or more tape drives unable to read and write data of a user due to deterioration of tracks in a data system, wherein the one or more old generation tape drives and the one or more tape drives are capable of reading servo signals.

5. The computer-implemented method of claim 1, further comprising:
   writing, by a new generation tape drive, newly written data to the one or more tape media;
   responsive to receiving a read request, loading the one or more tape media comprising the newly written data onto a readable tape drive; and
   executing a reading of the loaded tape media.

6. The computer-implemented method of claim 1, further comprising:
   notifying the tape library, by the one or more tape drives, that the one or more tape media is in a predetermined condition when ejecting the one or more tape media from the one or more tape drives; and
   managing, by the tape library, the one or more tape media ejected from the one or more tape drives, wherein the one or more tape drives in the tape library insert the managed one or more tape media into the one or more tape drives that do not contain the one or more tape media.

7. The computer-implemented method of claim 1, further comprising:
   performing a notification process, wherein the one or more tape drives comprising the one or more tape media with specific conditions are inserted reads the specific conditions recorded on the one or more tape medias and performs a specified processing when the specific conditions have been notified from the tape library.

8. A computer system for a mechanism for rewinding one or more tape at low tension, the computer system comprising:
   one or more computer processors;
   one or more computer readable storage media;
   program instructions stored on the one or more computer readable storage media for execution by at least one of the one or more computer processors, the program instructions comprising:
      program instructions to manage, by a web interface provided by a tape library, an inventory of one or more tape drives and the one or more tape media in the tape library;
      program instructions to record high tension discharge and distance measurement after formatting in a cartridge memory of the one or more tape media in the tape library;
      program instructions to manage the high tension discharge and the distance measurement after formatting in the cartridge memory of the one or more tape media by measuring a distance between servo bands utilizing one or more unused tape drives and one or more low frequency tape drives in the tape library; and
      program instructions to execute a rewind at low tension using the one or more unused tape drive and the one or more low frequency tape drives.

9. The computer system of claim 8, further comprising:
   program instructions to move the one or more tape media through a host computer;
   program instructions to unmount the one or more tape media from the one or more tape drives; and
   program instructions to move, by an arm, one or more tape media to a predetermined slot in a slot storage repository.

10. The computer system of claim 9, wherein program instructions to move, by the arm, one or more tape media to the predetermined slot in the slot storage further comprises program instructions to move one or more tape media to a predetermined slot upon instruction from the tape library, and program instructions to use a small computer system interface (SCSI) command by the host computer to read from and write to the one or more tape media.

11. The computer system of claim 8, wherein the one or more unused tape drives and low frequency tape drives comprise: one or more old generation tape drives and one or more tape drives unable to read and write data of a user due to deterioration of tracks in a data system, wherein the one or more old generation tape drives and the one or more tape drives are capable of reading servo signals.

12. The computer system of claim 8, further comprising:
   program instructions to write, by a new generation tape drive, newly written data to the one or more tape media;
   responsive to receiving a read request, program instructions to loading the one or more tape media comprising the newly written data onto a readable tape drive; and
   executing a reading of the loaded tape media.

13. The computer system of claim 8, further comprising:
   program instructions to notify the tape library, by the one or more tape drives, that the one or more tape media is in a predetermined condition when ejecting the one or more tape media from the one or more tape drives; and program instructions to manage, by the tape library, the one or more tape media ejected from the one or more tape drives, wherein the one or more tape drives in the tape library insert the managed one or more tape media into the one or more tape drives that do not contain the one or more tape media.

14. The computer system of claim 8, further comprising:

program instructions to perform a notification process, wherein the one or more tape drives comprising the one or more tape media with specific conditions are inserted reads the specific conditions recorded on the one or more tape medias and performs a specified processing when the specific conditions have been notified from the tape library.

15. A computer program product for a mechanism for rewinding a tape at low tension by measuring distance between servo bands utilizing unused/less frequently used tape drives, the computer program product comprising:

one or more computer readable storage media and program instructions stored on the one or more computer readable storage media, the program instructions comprising:

program instructions to manage, by a web interface provided by a tape library, an inventory of one or more tape drives and the one or more tape media in the tape library;

program instructions to record high tension discharge and distance measurement after formatting in a cartridge memory of the one or more tape media in the tape library;

program instructions to manage the high tension discharge and the distance measurement after formatting in the cartridge memory of the one or more tape media by measuring a distance between servo bands utilizing one or more unused tape drives and one or more low frequency tape drives in the tape library; and program instructions to execute a rewind at low tension using the one or more unused tape drive and the one or more low frequency tape drives.

16. The computer program product of claim 15, further comprising:

program instructions to move the one or more tape media through a host computer;

program instructions to unmount the one or more tape media from the one or more tape drives; and program instructions to move, by an arm, one or more tape media to a predetermined slot in a slot storage repository, wherein program instructions to move, by the arm, one or more tape media to the predetermined slot in the slot storage further comprises program instructions to move one or more tape media to a predetermined slot upon instruction from the tape library, and program instructions to use a small computer system interface (SCSI) command by the host computer to read from and write to the one or more tape media.

17. The computer program product of claim 15, wherein the one or more unused tape drives and low frequency tape drives comprise: one or more old generation tape drives and one or more tape drives unable to read and write data of a user due to deterioration of tracks in a data system, wherein the one or more old generation tape drives and the one or more tape drives are capable of reading servo signals.

18. The computer program product of claim 15, further comprising:

program instructions to write, by a new generation tape drive, newly written data to the one or more tape media;

responsive to receiving a read request, program instructions to loading the one or more tape media comprising the newly written data onto a readable tape drive; and executing a reading of the loaded tape media.

19. The computer program product of claim 15, further comprising:

program instructions to notify the tape library, by the one or more tape drives, that the one or more tape media is in a predetermined condition when ejecting the one or more tape media from the one or more tape drives; and program instructions to manage, by the tape library, the one or more tape media ejected from the one or more tape drives, wherein the one or more tape drives in the tape library insert the managed one or more tape media into the one or more tape drives that do not contain the one or more tape media.

20. The computer program product of claim 15, further comprising:

program instructions to perform a notification process, wherein the one or more tape drives comprising the one or more tape media with specific conditions are inserted reads the specific conditions recorded on the one or more tape medias and performs a specified processing when the specific conditions have been notified from the tape library.

* * * * *